E. S. WHYTE.
COMBINED SPOON AND FORK.
APPLICATION FILED SEPT. 26, 1919.

1,337,174. Patented Apr. 13, 1920.

Inventor
E. S. Whyte

Witnesses
By Victor J. Evans
Attorney

UNITED STATES PATENT OFFICE.

EDWARD S. WHYTE, OF LOWELL, MASSACHUSETTS.

COMBINED SPOON AND FORK.

1,337,174.	Specification of Letters Patent.	Patented Apr. 13, 1920.

Application filed September 26, 1919. Serial No. 326,481.

*To all whom it may concern:*

Be it known that I, EDWARD S. WHYTE, a citizen of the United States, residing at Lowell, in the county of Middlesex and State of Massachusetts, have invented new and useful Improvements in Combined Spoons and Forks, of which the following is a specification.

One object of my present sole invention is the provision of a combined spoon and fork; the fork being adjustable relatively to the spoon, so that when the fork is not in use its tangs are guarded by the bowl of the spoon.

Another object of the invention is the provision of a duplex spoon—*i. e.*, a spoon having at its opposite ends combined bowls and handles; the bowls being reversely arranged and one bowl being of tablespoon size and the other bowl of teaspoon size, whereby in a single one-piece article is produced two devices which have heretofore been made separately at increased cost.

To the attainment of the foregoing the invention consists in the improvement as hereinafter described and definitely claimed.

In the accompanying drawings, hereby made a part hereof;

Similar numerals of reference designate corresponding parts in all of the views of the drawings.

Figure 1:
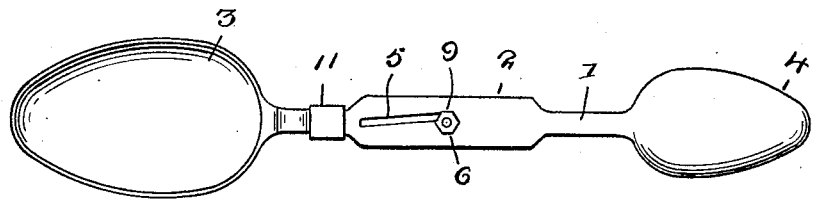
Figure 1 is a plan view of one side of my improved device.
Figure 2:
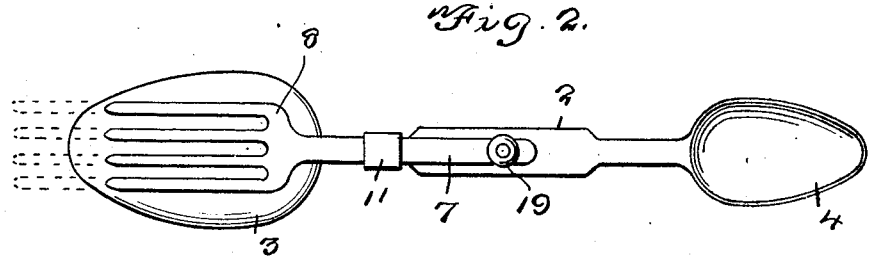
Fig. 2 is a similar view of the opposite side of the device.
Figure 3:
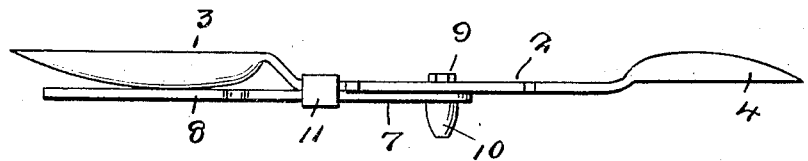
Fig. 3 is an edge elevation of the device.
Figure 4:
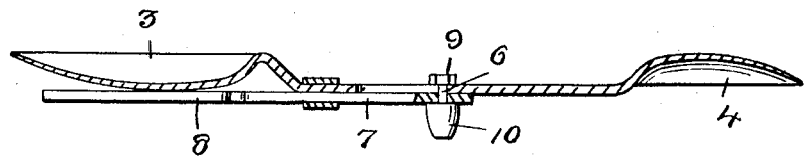
Fig. 4 is a longitudinal central section of the device.
Figure 5:
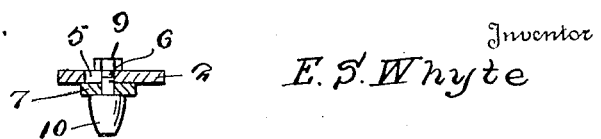
Fig. 5 is a transverse section taken in the plane indicated by the line 5—5 of Fig. 2.

Among other elements my combination device comprises a handle portion 1 increased in width at its middle, as indicated by 2. At one end the handle portion 1 is provided with a bowl 3 of tablespoon size, and at its opposite end said handle carries a bowl 4 of teaspoon size. These bowls are integral with the handle portion 1 and are reversely arranged, as illustrated—*i. e.*, the face of one bowl is at one side of the spoon, and the face of the other bowl is at the opposite side of the spoon, and from this it follows that when one bowl is being used in the conventional manner, the other bowl constitutes part of the handle of the bowl in use, and improves the handle to the extent of enabling the user to take secure hold of the spoon. Again it will be appreciated that combining as it does the two spoons in one device, the improvement makes for economy in production, and also tends to lessen the space required for the requisite number of tablespoons and teaspoons.

In the handle portion 1 is provided a longitudinal slot 5, and in said slot is arranged to be moved a threaded pin 6, carried by the shank 7 of the fork 8. The shank 7 is arranged at one side of the handle portion 1, and is secured to said handle portion by a nut 9 that is mounted on the pin 6 and is opposed to the side of the handle portion 1 remote from the shank 7. The head 10 of the pin 6 is so shaped and relatively arranged as illustrated as to serve as a finger-piece for adjustment of the fork.

In order to prevent edgewise deflection of the fork 8 without interfering with rectilinear movement thereof, I surround the handle portion 1 and the fork shank 7 with a loop 11.

It will be apparent from the foregoing that when it is desired to use the fork 8, it is simply necessary for the user to grasp the pin head 10 and move the fork longitudinally outward so that the tangs of the fork are guided upon the end of the large spoon bowl 3. When, however, the fork is not to be used, the fork is retracted longitudinally and so that it rests as a whole within the outline of the spoon bowl 3 and snug against the rear side thereof. Manifestly in this latter position the fork is adequately guarded and yet is so relatively arranged as not to interfere in any measure with the use of the device as a spoon.

Having described my invention, what I claim and desire to secure by Letters-Patent, is:

The combination with a spoon having a bowl and a handle portion in which is a longitudinal slot; of a fork arranged at the rear side of the spoon and having tangs and a shank, a loop surrounding the handle portion of the spoon and the shank of the fork, a threaded pin extending through the fork shank and the slot of the spoon handle and having a head at the rear side of said shank, and a nut mounted on said shank and disposed at the side of the spoon handle remote from the fork.

In testimony whereof I affix my signature.

EDWARD S. WHYTE.